United States Patent [19]
Brandt et al.

[11] 3,969,023
[45] July 13, 1976

[54] METHOD AND APPARATUS FOR DETECTING LAYERS OF STRESS IN LENSES

[75] Inventors: Neill M. Brandt, Sturbridge, Mass.; Emil W. Deeg, Woodstock, Conn.

[73] Assignee: American Optical Corporation, Southbridge, Mass.

[22] Filed: Mar. 6, 1975

[21] Appl. No.: 556,023

[52] U.S. Cl. .................................. 356/33; 356/114
[51] Int. Cl.² ............................................ G01B 11/16
[58] Field of Search ................ 356/30, 33, 35, 114; 73/88 A

[56] References Cited
UNITED STATES PATENTS

| | | | |
|---|---|---|---|
| 2,375,399 | 5/1945 | Wittig | 356/33 |
| 2,388,352 | 11/1945 | Vent | 356/33 |
| 2,869,417 | 1/1959 | Allen | 356/30 |
| 3,052,153 | 9/1962 | Powell | 356/33 |
| 3,589,812 | 6/1971 | Malakoff et al. | 356/33 |
| 3,815,997 | 6/1974 | Alaska | 356/33 |

*Primary Examiner*—Ronald J. Stern
*Assistant Examiner*—Wm. H. Punter
*Attorney, Agent, or Firm*—H. R. Berkenstock, Jr.; William C. Nealon

[57] ABSTRACT

A glass ophthalmic lens which has been strengthened by thermal tempering or ion exchange treatment has increased impact resistance and durability, but such strengthening does not alter the appearance of the lens sufficiently to render the presence or absence of strengthening visually ascertainable even by one of high skill. It being necessary to inspect for the presence or absence of strengthening prior to dispensing lenses to the public, the present invention contemplates immersion of the lenses in a transparent liquid of approximately the same refractive index as the material of the lenses and projection of linearly polarized light through the fluid and lens. Viewing of the thus illuminated lens through a light polarizing analyzer reveals readily observable stress patterns in strengthened lenses and a lack of such patterns in non-strengthened lenses.

1 Claim, 3 Drawing Figures

METHOD AND APPARATUS FOR DETECTING LAYERS OF STRESS IN LENSES

BACKGROUND OF THE INVENTION

1. Field of the Invention:

This invention relates to the inspection of glass articles for the detection of stress in surfaces thereof and is more particularly concerned with apparatus and method for inspecting surface treated glass ophthalmic lenses for the presence or absence of stress patterns prior to dispensing such lenses to the public, especially in cases of the more difficult to detect stress patterns which result from lens strengthening by ion exchange treatment.

2. Discussion of the Prior Art:

In order to enhance the impact resistance of glass ophthalmic lenses so as to safeguard against injury to the eyes of the wearer and yet not require ophthalmic lenses to be of ungainly and/or prohibitive thicknesses and weight, it has become customary to treat the surfaces of these lenses in such manner as to introduce a surface compressive stress therein. This may be accomplished by thermal tempering or chemical ion exchange treatment. Thermally tempered glass is produced by rapidly cooling a glass piece which has been heated to near the softening point. This produces a compressive stress in the surface of the article while the interior of the article is under tensile stress.

The most commonly used process to strengthen ophthalmic lenses by ion exchange utilizes the introduction of a compressive stress at the surface by the substitution of a larger monovalent alkali metal ion for a smaller monovalent alkali metal ion in the surface of the article causing its surface to become more densely packed than its interior.

The terms "surface treatment", "surface treated" and variations thereof as used in this specification and its appended claims are intended to include all surface layers which may be used to strengthen the subject articles, regardless of the precise method by which such layers are formed. Layers of stress are herein considered as being surface treated layers whether produced by thermal tempering, chemical ion exchange or otherwise.

Since neither of the foregoing methods of surface treatment alter the appearance of the treated article sufficiently so that the presence or absence of treatment may be ascertained visually and there is the aforesaid need to determine the presence or absence of treatment whether produced thermally, chemically or otherwise, industry heretofore has been obliged to invest in complex and expensive testing apparatuses or systems especially when testing for the presence or absence of the considerably more difficult to detect surface stresses produced by chemical treatment (ion exchange). Exemplary of such systems are those of U.S. Pat. Nos. 3,746,450 and 3,807,867.

The alternative to employing the aforesaid relatively complicated and expensive detecting apparatuses being relatively unreliable systems for visually observing birefringence of relatively small portions only of lenses, has left the industry with a need for greater simplification, economy and reliability in method of testing ophthalmic lenses for the presence or absence of layers of surface compression, i.e. the presence or absence of enhanced impact resistance.

Accordingly, a principal object of the present invention is to provide apparatus and method for reliably positively detecting the presence or absence of thin layers of stress in ophthalmic lenses and more particularly to make possible the detection of treatment having been performed by ion exchange with positive assurance of either its presence or absence.

SUMMARY OF THE INVENTION

The present invention accomplishes the foregoing objective and its corollaries by immersing a test article (e.g. ophthalmic lens) in a liquid having an index of refraction which is similar to that of the material of the article and projecting linearly polarized light through the liquid and article. Observance of the presence or absence of layers of stress in the article is then accomplished by viewing the immersed article through a light polarizing analyzer, i.e. a light polarizer having its axis of polarization disposed perpendicularly to the axis of polarization of the aforesaid linearly polarized light.

When the article being observed is an ophthalmic lens having a compressive stress in its surface produced by thermal tempering, a pattern in the configuration of a Maltese cross with bright rim band or central mottled gray region with bright rim band will be seen. The legs of the cross, which extend to interruptions of the bright rim band, define the axes of the polarizer and the analyzer.

In the case of an immersed ophthalmic lens having been previously surface treated by chemical ion exchange, which produces a thin layer of tangential compression in the rim of the lens, the lens is observed as having peripherally spaced brightly illuminated bands about its rim. The extensions of these spaced brightly illuminated bands coincide with portions of the lens rim which are oriented at approximately 45° to axes of polarization of the aforesaid polarized light and the polarizing analyzer. They appear most intense at precisely the 45° position, fading away at opposite sides thereof adjacent parts of the lens rim which are non-illuminated (i.e. substantially invisible) and disposed either right angularly or parallel to the axis of polarization of the analyzer. The observation of the four sections of the bright band in the lens rim indicates the presence of tangential stress in the rim, and hence indicates previous lens strengthening by the ion exchange treatment.

Further verification of a finding of strengthening by ion exchange (i.e. observance of the bright bands) may be had by rotation of the lens or test article in its immersion liquid whereupon a fixed location of the dark areas of the lens rim relative to the analyzer or liquid container will indicate a true observance of tangential stress in the rim and hence enhanced impact resistance. The observance of more or less than four dark areas and/or four bright bands about a completely immersed lens may indicate brightness produced by diffused light being reflected or refracted at the lens edge and not necessarily brightness caused by stress condition which is required for verification of enhanced impact resistance. Accordingly, complete evidence of lenses having been ion exchange treated can only be had by the observance of four separated bright bands and four dark areas between the bands. This then requires complete immersion of the lens and the ability to view the complete circumference of the lens. Partial immersion and/or observance of less than the entire extension of the lens edge may not produce positive test results.

3

Details of the invention will become more readily apparent from the following description when taken in conjunction with the accompanying drawings.

IN THE DRAWINGS

FIG. 1 is a diagrammatic illustration of apparatus useful in carrying out the method of the present invention and wherein an ophthalmic lens is illustrated as an exemplary test article;

FIGS. 2 and 3 are plan views of the apparatus of FIG. 1 wherein the effect of layers of stress as visually observed according to the invention is diagrammatically illustrated; FIG. 2 illustrates the type of pattern observed for lenses having stress induced therein by thermal tempering and FIG. 3 illustrates the type of pattern observed for lenses having stress induced therein by ion exchange treatment.

DESCRIPTION OF THE PREFERRED EMBODIMENTS

Figure 1:
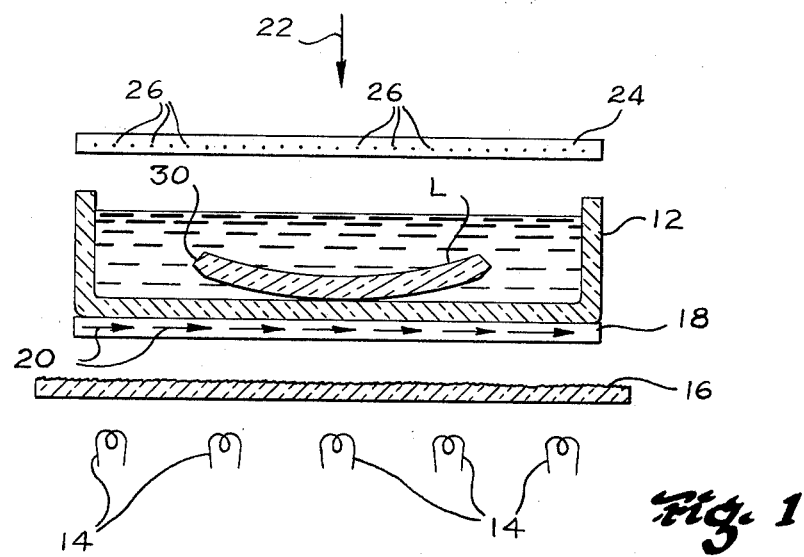

Referring more particularly to the drawings, FIG. 1 illustrates the method of the invention wherein, for purposes of detecting the presence or absence of layers of surface stress in lenses and thus an indication of treatment of the lenses for increased impact resistance, a lens L under test is completely immersed in a liquid having an index of refraction matching or approximately equal to that of the material of the lens. The liquid 10 is chosen to be such surface tension and character as to wet or otherwise make intimate optical contact with all surfaces of the lens and not itself be optically active or birefringent.

Liquid 10 is placed in a transparent container 12 formed of quartz, glass or a clear plastic material which is free of stress and strain and not birefringent or otherwise optically active. Exemplary of such a container is the well-known petri dish conventionally used for plate cultures in bacteriology. The container may have a cover, if desired. However, the cover must not be optically active.

Linearly polarized light is directed through container 12, fluid 10 and lens L. The source of this light may, for example, comprise an array of incandescent lamps 14 having an accumulated wattage rating from 75 to 100. Diffusion screen 16, e.g. a ground glass plate or the equivalent, is preferably incorporated in the lighting system to more uniformly distribute the light from lamps 14 across the fluid 10 in container 12. Interposed between screen 16 and container 12 is light polarizer 18 having a unidirectional axis of polarization which, for purposes of this illustration, is shown by arrows 20 as being in a direction parallel to the plane of the paper.

Viewing of the thus immersed and illuminated lens L (e.g. from the position of arrow 22) for purposes of detecting treatment of lens L is accomplished through a second polarizer 24 hereinafter referred to as analyzer 24. Analyzer 24 is preferably similar to polarizer 18 in that it is plane polarizing to light and has a unidirectional axis of polarization. For purposes of this invention, analyzer 24 is oriented with its axis of polarization orthogonal to the axis of polarization of polarizer 18. Dots 26 indicate this direction of polarization as being perpendicular to the paper of the drawing.

Polarizers 18 and 24 may, for example, each comprise a film or sheet of polyvinyl alcohol having its molecules oriented by stretching or brushing in the directions indicated by arrows 20 and/or dots 26. The polyvinyl alcohol may be stained with a dichroic dye or the like. Such films of polyvinyl alcohol are normally laminated to or otherwise backed by substrates of clear isotropic materials. Those interested in greater details of the aforesaid general type of plain-parallel light polarizers may refer to U.S. Pat. Nos. 2,173,304 and 2,270,323.

In the case of a lens L which has been ion exchange treated for enhanced impact resistance after having its edge 30 (FIG. 1) beveled for example, an entirely different pattern consisting of four brightly illuminated bands 32 (FIG. 3) will become visible. All remaining portions of the lens L will be substantially invisible thereby forming dark areas 34, four in number, between bands 32. This observed effect or "signal" (i.e. the bright bands) is the result of disturbance by the lens edge 30 of the plane of polarization of linearly polarized light. This disturbance is such that linearly polarized light is enabled to pass through the second polarizer, i.e. analyzer 24. This effect would not become visible without immersion of lens L in liquid 10 since the edge 30 would normally allow very little light to pass therethrough due to scattering and depolarization thereof. Liquid 10, however, making intimate optical contact with lens edge 30 effectively cancels out prism power of the bevel and greatly reduces light scattering and depolarization by asperities of the bevel surfaces.

The signal or observance of bright bands 32 with dark areas 34 may be maximized by a perfect refractive index match between liquid 10 and the material of lens L. It has been found, however, that a liquid 10, lens L material refractive index mismatch of at least as much as four units of deviation in the second decimal place can be tolerated. It is further preferably that the polarizing axes of light polarizer 18 and analyzer 24 be crossed at 90° with a tolerance of ±5°.

Figure 2:
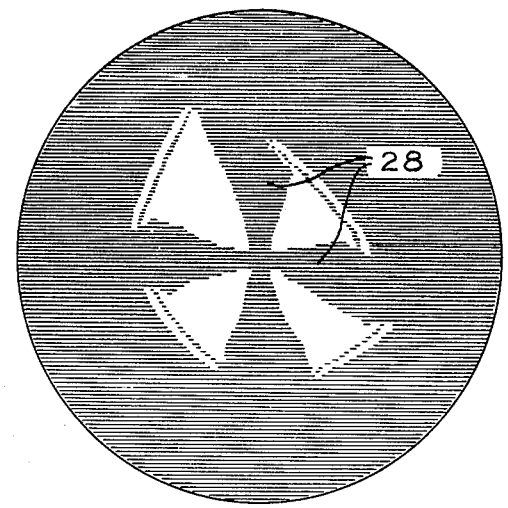
Figure 3:
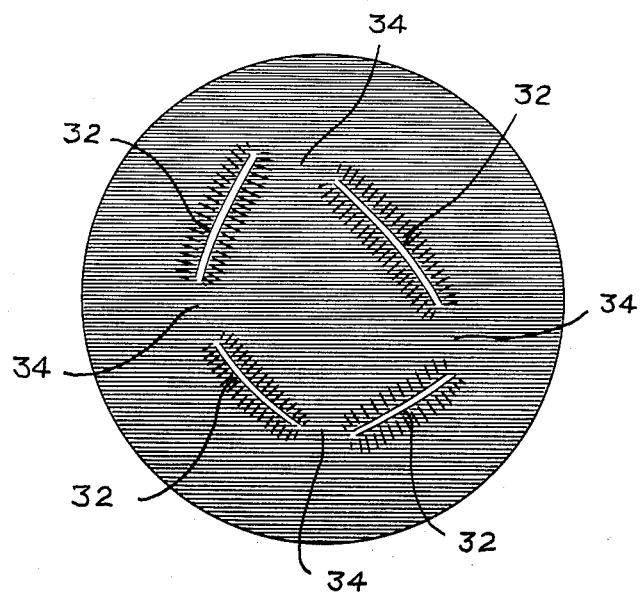

In either of the cases of the observance of thermally tempered lenses (FIG. 2) or chemically treated lenses (FIG. 3) the absence of patterns shown in FIGS. 2 and 3 would indicate no substantial surface treatment. Without surface stress in the lenses, they would be substantially invisible in the system of FIG. 1.

Full and complete evidence of chemical ion exchange treatment and enhanced impact resistance of lens L requires the observance of the four dark sections 34 (FIG. 3) in the rim of the lens and/or the four peripherally separated bright bands 32. The fixed location or non-movement of the four dark sections when the specimen lens is rotated in liquid 10 further verifies the aforesaid findings.

For purposes of ease of cleaning of lenses tested according to the invention, it is desirable that the liquid 10 be water soluble. Nevertheless, any one of the following liquids may be used for testing lenses of ophthalmic crown glass having a refractive index of 1.523: glycerine; aniline; benzene; pyridine; chlorobenzene; trimethylene bromide; pentachloroethene; ortho-nitrotoluene; dipropylene glycol dibenzorate; xylol; cedar oil; mixtures of ethylene, bromide and chlorobenzene; and kerosene.

We claim:

1. The method of determining the presence, absence and type of treatment of lenses for impact resistance by visual observance of layers of surface stress in the lenses comprising the steps of:

immersing a test lens of glass having a predetermined index of refraction in a liquid having a refractive index at least approximating that of the lens;

directing light which is linearly polarized in a given fixed direction through said immersed lens for transmittance away therefrom toward a remote observation location;

interposing between said observation location and immersed lens a linear light-polarizing analyzer having an axis of polarization directed approximately orthogonally to said given direction of polarization of said light whereby patterns of alternate areas of brightness and darkness produced by the test lens and observed directly upon said lens from said observation location will indicate layers of stress in said lens while an absence of such patterns will indicate a lack of surface stress in the lens and particular configurations of observed patterns will indicate the type of treatment; and rotating the test lens in said liquid and observing whether said patterns of alternate areas of darkness move with rotation of the lens, non-movement of said patterns of darkness verifying a finding of layers of stress in the lens.

* * * * *